United States Patent
Griesmer et al.

(10) Patent No.: US 6,586,744 B1
(45) Date of Patent: Jul. 1, 2003

(54) METHOD OF COOLING HIGH DENSITY ELECTRONICS

(75) Inventors: Jerome J. Griesmer, Kirtland, OH (US); Barry D. Kline, Cleveland Hts, OH (US)

(73) Assignee: Marconi Medical Systems, Inc., Highland Heights, OH (US)

( * ) Notice: Subject to any disclaimer, the term of this patent is extended or adjusted under 35 U.S.C. 154(b) by 14 days.

(21) Appl. No.: 09/721,817

(22) Filed: Nov. 24, 2000

(51) Int. Cl.$^7$ .................................................. G01T 1/24
(52) U.S. Cl. ............................ 250/370.15; 250/370.09; 250/370.13
(58) Field of Search ....................... 250/370.09, 370.13, 250/370.15

(56) References Cited

U.S. PATENT DOCUMENTS

| | | | |
|---|---|---|---|
| 4,090,080 A | | 5/1978 | Tosswill ..................... 250/366 |
| 4,262,207 A | | 4/1981 | Tosswill ................... 250/363.1 |
| 4,460,235 A | * | 7/1984 | Gelin .......................... 439/629 |
| 4,571,495 A | * | 2/1986 | Distler et al. ............ 250/370.09 |
| 4,831,639 A | * | 5/1989 | Harke ..................... 250/370.15 |
| 4,982,096 A | | 1/1991 | Fujii ........................... 250/367 |
| 5,077,770 A | | 12/1991 | Sammon ....................... 378/101 |
| 5,742,060 A | * | 4/1998 | Ashburn ................ 250/363.09 |
| 5,967,983 A | | 10/1999 | Ashburn ...................... 600/436 |
| 5,991,357 A | | 11/1999 | Marcovici .................... 378/19 |
| 6,013,877 A | * | 1/2000 | Degani et al. ............... 174/264 |
| 6,046,454 A | | 4/2000 | Lingren et al. ......... 250/370.01 |
| 6,055,450 A | | 4/2000 | Ashburn ...................... 600/431 |
| 6,091,070 A | | 7/2000 | Lingren et al. ......... 250/370.09 |

OTHER PUBLICATIONS

G.L. Zeng, et al. "Eigen Analysis of Cone–Beam Scanning Geometries." *Three–Dimensional Image Reconstruction in Radiation and Nuclear Medicine* © 1996 by Kluwer Academic Publishers, Netherlands, pp. 75–86.

G.L. Zeng, et al., "A cone beam tomography algorithm for orthogonal circle–and–line orbit." *Phys. Med. Biol.*, 1992, vol. 37, No. 3, 563–577.

S.Webb, et al., "Monte Carlo modelling of the performance of a rotating slit–collimator for improved planar gamma–camara imaging," *Phys.Med. Biol.*, vol. 37, No. 5, 1095–1108, 1992.

Mauderli, et al., "A Computerized Rotating Laminar Radionuclide Camera." *J. Nucl. Med.* 20::341–344 (1979).

Entine, et al., "Cadmium Telluride Gamma Camera," *IEEE Transactions on Nuclear Science* vol. NS–26, No. 1:552–558 (1979).

Urie, et al., "Rotating Laminar Emission Camera with GE–detector," *Med. Phys.* 8(6):865–870 (1981).

Mauderli, et al., "Rotating Laminar Emission Camera with GE–detector," *Med Phys.* 8(6):871–876 (1981).

Malm, et al., "A Germanium Laminar Emission Camera," *IEEE Transactions on Nuclear Science*, vol. NS–29, No. 1:465–468 (1982).

Mauderli, et al., "Rotating Laminar Emission Camera with GE–Detector: Further Developments," *Med. Phys.* 14(6):1027–1031 (1987).

\* cited by examiner

*Primary Examiner*—David Porta
*Assistant Examiner*—Shun Lee

(57) ABSTRACT

A subject (10) is disposed adjacent a detector array (18) for the purposes of nuclear imaging. The subject (10) is injected with a radioactive isotope (14) and γ-ray emissions indicative of nuclear decay are detected at the detector array (18). P-ASIC (60) preamplifier circuits are complex low-noise integrated circuits which dissipate a considerable amount of power (300–500 mW each). These components account for most of the dissipated power on the daughter cards (62). In order to facilitate the cooling of these electrical components, they are mounted on circuit boards (62) that are arranged parallel to each other extending perpendicularly away from the detector array (18). This provides channels between the boards through which cooling air is drawn by an array of fans (84).

2 Claims, 5 Drawing Sheets

METHOD OF COOLING HIGH DENSITY ELECTRONICS

BACKGROUND OF THE INVENTION

The present invention deals with the diagnostic imaging arts. It finds particular application in conjunction with electronics used in nuclear cameras and will be described with particular reference thereto. However, it is to be appreciated that the present invention has application in other devices that have electronics that require cooling and is not limited to the aforementioned application.

Nuclear imaging employs a source of radioactivity togs image the anatomy of a subject. Typically, a radiopharmaceutical is injected into the patient. This radiopharmaceutical contains atoms that decay at a predictable rate. Each time an atom decays, it releases a γ-ray. These γ-rays are detected, and from information such as their detected position and energy, a representation of the interior of the subject is reconstructed.

Typically, a nuclear camera has one, two, or three detector heads. Each head has a large scintillator sheet, such as doped sodium iodide, which converts incident radiation into flashes of light. An array of photomultiplier tubes is disposed in back of the scintillator to monitor for light flashes. The output of the photomultiplier tubes and associated circuitry indicates the coordinates of each scintillation on the sodium iodide crystal and its energy. Unfortunately, there are numerous non-uniformities and inaccuracies when using a large scintillator crystal and an array of photomultiplier tubes.

Rather than using a single, large scintillator and photomultiplier tubes, others have proposed using an array of small scintillators, each associated with a photodiode or other photoelectrical device which senses a scintillation in each individual scintillation crystal. Other types of individual solid-state detectors have also been suggested.

For resolution on the order of a millimeter, each scintillator/photodiode or other detector element is typically on the order of a millimeter square. Each of the detector elements needs to be powered and to have its output electrical signals processed. Typically, the powering and at least a portion of the processing circuitry is mounted in close association with the individual detectors. This leads to a high density of electrical components, many of which generate significant heat. Cooling the electronics becomes a significant problem.

The present invention provides a new and improved method and apparatus that overcomes the above referenced problems and others.

SUMMARY OF THE INVENTION

In accordance with one aspect of the present invention, a nuclear imaging apparatus is given. An array of detectors detects γ-rays, information about the γ-rays are processed by electronics, a cooling system cools the electronics, and a reconstruction processor converts the γ-ray information into an image representation.

According to a more limited aspect of the present invention, the detector is an array of cadmium-zinc-telluride crystals.

According to a more limited aspect of the present invention, the detectors are collimated in one dimension.

According to a more limited aspect of the present invention, the cooling system includes fans and a cooling region.

According to a more limited aspect of the present invention, L-shaped connectors allow heat producing circuit boards to be disposed such that their disposition facilitates cooling.

According to a more limited aspect of the present invention, event analyzers detect events, their strength, and their locations, and sends this information to be stored in an event archive.

According to another aspect of the present invention, a nuclear camera is given. A detector head includes a housing within which are an array of detectors, circuit boards defining air channels, and heat generating P-ASICs mounted on the circuit boards.

According to a more limited aspect of the present invention, the circuit boards are mounted back to back in pairs.

According to another aspect of the present invention, a method of nuclear imaging is given. A subject is injected with a radiopharmaceutical that emits γ-rays. The γ-rays are detected by electronics and reconstructed into an image representation. The electronics are arranged to facilitate their cooling and they are cooled.

According to another aspect of the present invention, a method of nuclear imaging is given. γ-rays are detected by an array of detector arrays. The array is mounted on heat generating circuitry and air is passed along the circuitry to cool it. Signals are processed from the detector array and converted into an image representation.

According to a more limited aspect of the present invention, the detector array is biased by high-voltage circuitry on the board. The signals from the detector array are pre-amplified by P-ASICs on the circuit boards.

One advantage of the present invention is that it keeps electrical components at safe temperature levels.

Another advantage of the present invention is that it allows for a large number of detectors in a small area.

Another advantage of the present invention resides in high sensitivity and detailed spatial sampling resolution.

Yet another advantage of the present invention is that it avoids the use of liquid coolant or cryogenic cooling.

Still further benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT

Figure 1:
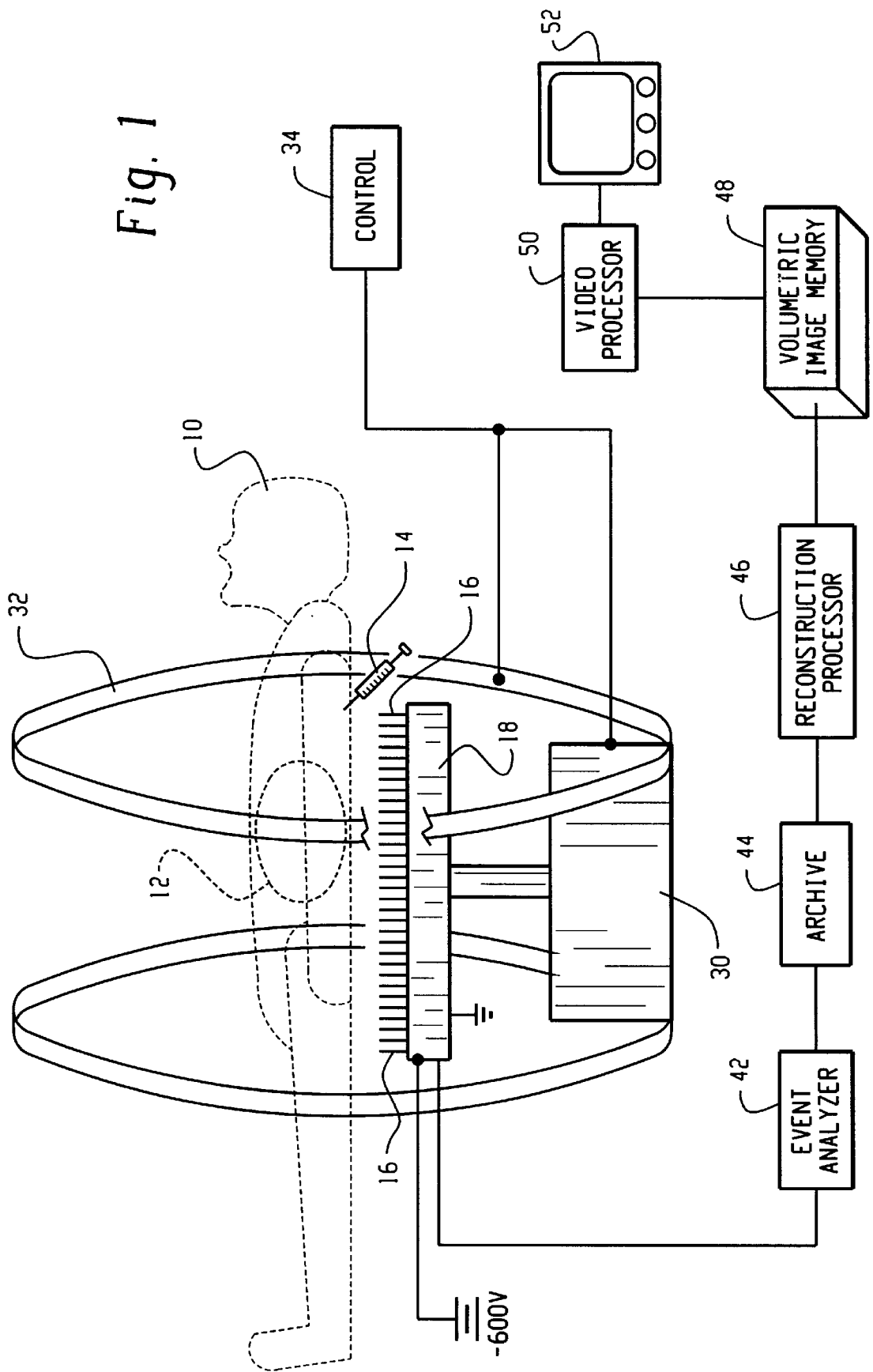
FIG. 1 is a diagrammatic illustration of a nuclear imaging device in accordance with the present invention.

With reference to FIG. 1, a subject 10 defines an imaging region 12. In the preferred embodiment, a radioactive isotope 14 is injected into the subject, near a region to be imaged. For example, if a physician wanted to view a blockage in the aorta, the isotope would be injected into the bloodstream upstream from the blockage. As another example, the radiopharmaceutical is injected into the circulatory system and its absorption by tissue of interest is monitored.

As quantum physics predicts, atomic nuclei of the radioactive isotope decay over time. Energy is released at the time of decay in the form of a photon, more specifically, a γ-ray of characteristic energy.

Many of the γ-rays produced during an imaging process will be lost, propagating in useless directions. However, some of the γ-rays pass through collimators 16, thin tungsten vanes in the preferred embodiment, and strike a detector array 18. In the preferred embodiment and with reference to FIG. 2, the detector array 18 includes a 4×24 array of cadmium zinc telluride (CZT) crystal arrays 20, each having 4×8 individual detectors 22. In the preferred CZT embodiment, a potential difference of −600 V applied across the detector arrays by high voltage filter circuits powered by a high voltage power supply 24.

In the preferred embodiments, the detector array 18 and collimators 16 are mounted on a mechanized drive 30 that moves the detector array. Preferably, the array moves with lateral rotational components of motion, although various trajectories are contemplated. In some applications, the detector array is stationarily mounted within a movable gantry that is indexed around the region of interest.

In the preferred embodiment, the support is mounted on a rotatable gantry 32 which extends fully around the subject 10. A motor control 34 selects a range of motion of the detector array 18, if any, within the rotatable gantry and rotation of the gantry 32 stepwise or continuously around the image region.

In SPECT imaging, the collimator 16 limits access to the detector array 18 to radiation following prescribed paths or trajectories, e.g., trajectories perpendicular to the plane of the detector array 18. In this manner, each radiation event defines a trajectory along which a radioisotope decayed. If the movable gantry 32 remains stationary, the detectors define a projection image of the radioisotope distribution in the region of interest. An event analyzer 42 determines the location at which each event strikes the detector array, i.e., which detector receives it and the amount of energy of the radiation event. The radiation events collected at each stationary position of the detector array are stored in an archive 44. When the rotatable gantry 32 is rotated to different angular positions around the subject, a plurality of projection images from different angular orientations are collected. A reconstruction processor 46 backprojects or otherwise reconstructs the data from the archive memory 44 into a volumetric image representation for storage in a volumetric image memory 48. A video processor 50 under operator control selectively withdraws portions of the volumetric image representation and converts them into appropriate form for display on a video or other human-readable monitor 52.

Figure 2:
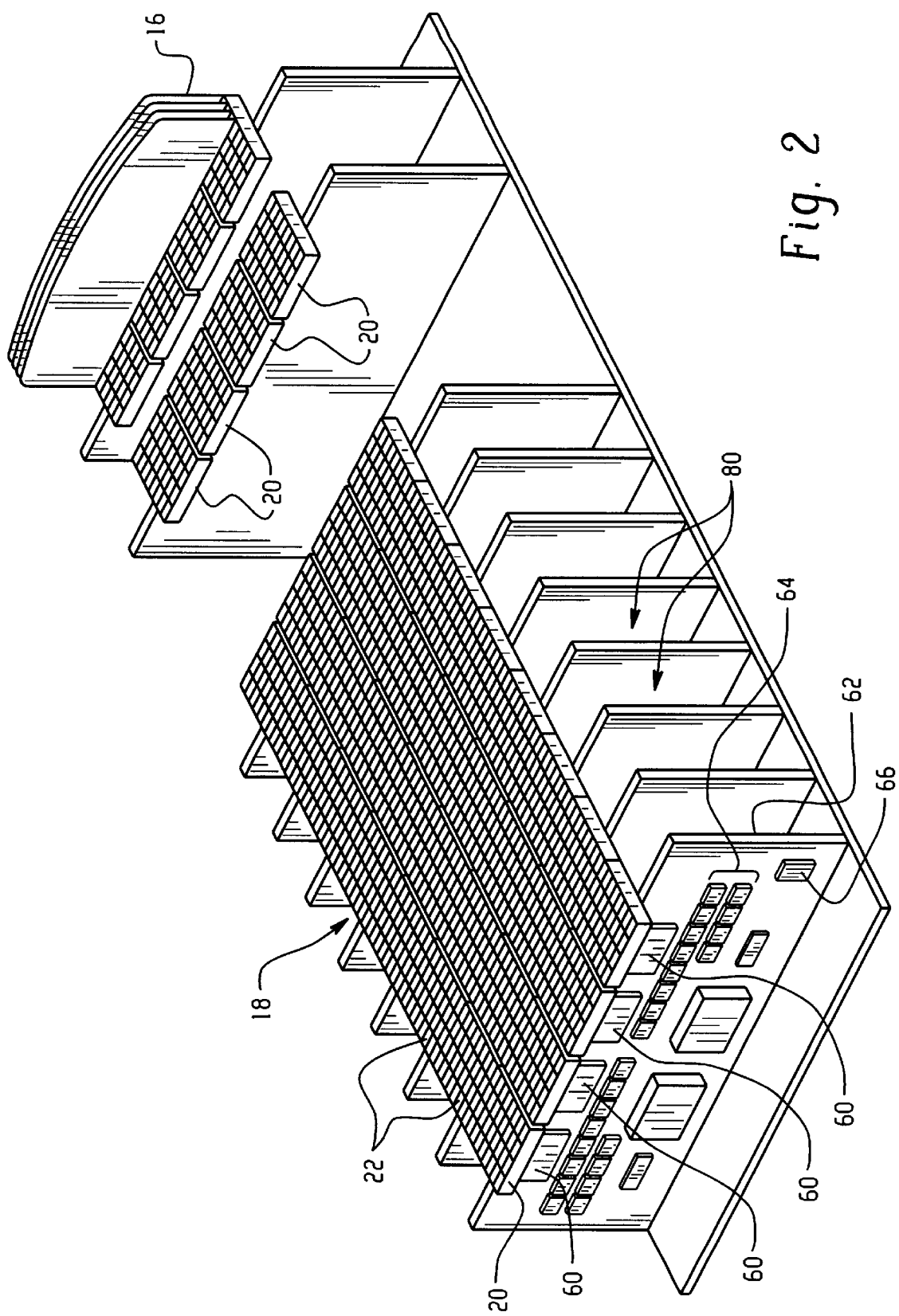
FIG. 2 is a perspective view of a detector array and associated circuit boards.
Figure 3:
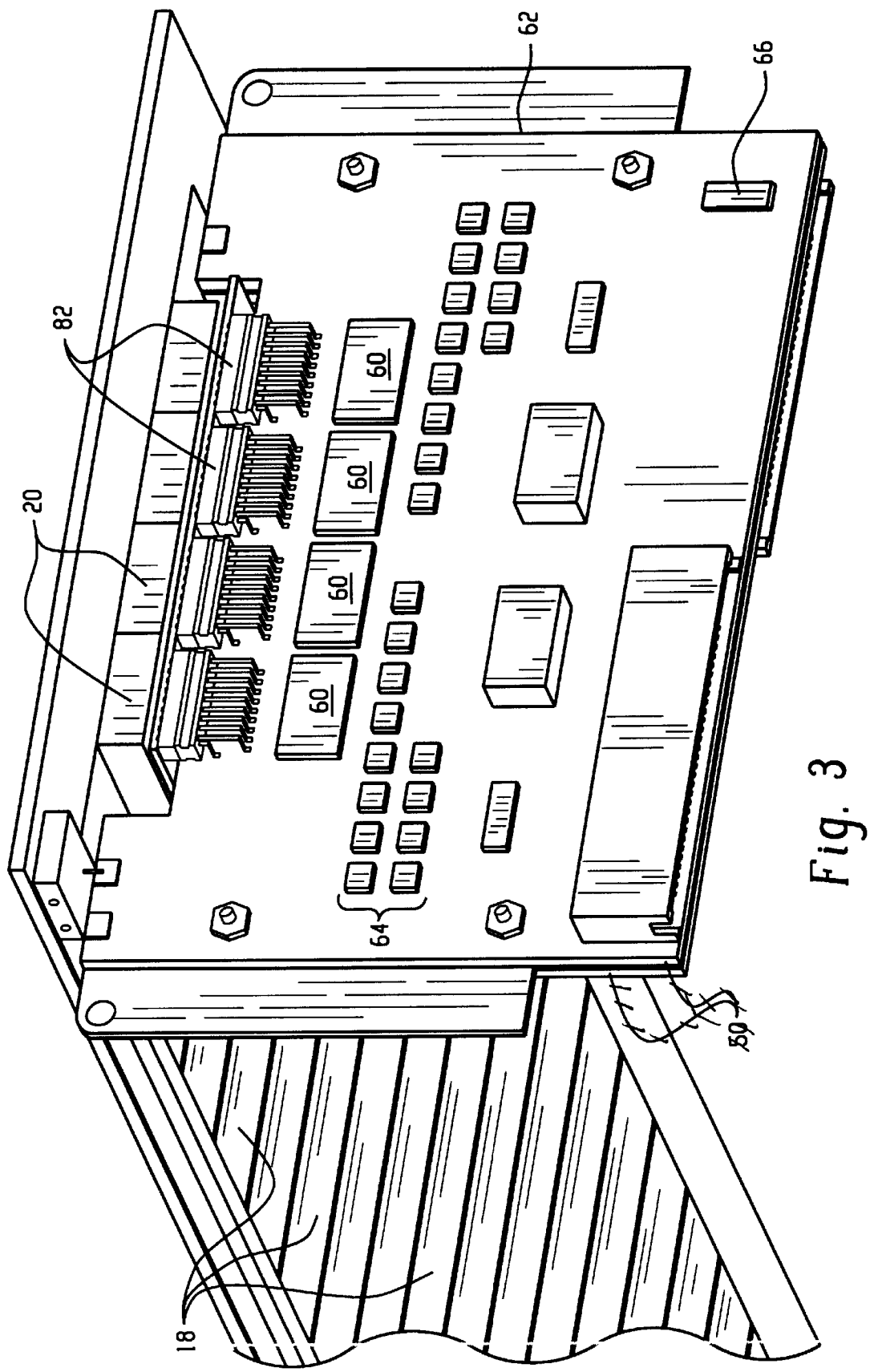
FIG. 3 is a perspective view of one of the circuit boards and detector array.

With reference to FIG. 3 and continuing reference to FIGS. 1 and 2, received γ-rays are detected and their energy measured by electronics attached to the detector array 18. Four P-ASIC 60 are mounted on each side of a circuit board or pair of back-to-back circuit boards 62 that support four of the detector arrays. More specifically to the preferred embodiment, each P-ASIC preamplifies half of one of the arrays 20.

Each time a γ-ray strikes one of the detectors, an avalanche effect releases electrons producing an output electrical pulse. Associated P-ASICs 60 powered by voltage regulator 66 amplify and condition the pulses from the detectors. Subsequent electronic components 64 select and multiplex a signal of interest to circuits that digitize and archive the series of outputs to portions of the event analyzer 42 mounted remotely.

Figure 4:
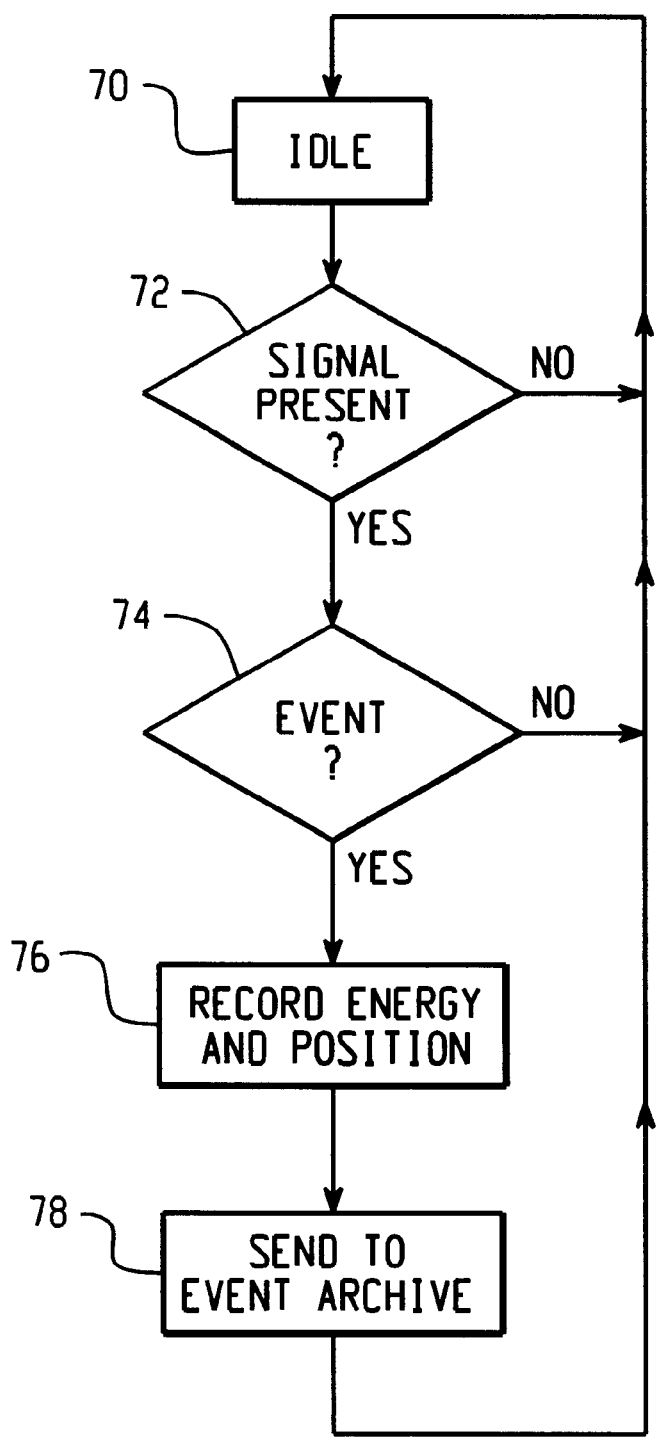
FIG. 4 is a flowchart illustrating the activity of an event analyzer, in accordance with the present invention; and, FIG. 5 is a perspective view of the detector array, circuit boards, and cooling fans.

With reference to FIG. 4, in the preferred embodiment, the circuitry 64 or the remote portion of event analyzer 42 is normally idle 70, awaiting an electrical signal. When the event analyzer 42 receives an electrical signal, it compares it to a threshold 72. If the signal is less than the threshold, it is ignored as noise, and the analyzer 42 goes back to idle. If the signal is above the threshold, the analyzer classifies it as an event 74, and records 76 the energy of the signal, and the position of the detector 22 that sent the signal. The analyzer 42 then communicates 78 this information to the event archive 44 where it is stored for future use. After this communication, the analyzer 42 returns to idle awaiting the next event. In the preferred embodiment, once the analyzer 42 comes out of idle, in the next clock cycle, (preferably within 20 ns) other events are locked out until the analyzer 42 returns to idle. In the case of a true event, the process is completed, and the analyzer is back in idle in less than 2 μs. In the case of a false event, the analyzer 42 includes a timeout feature that only allows a set amount of time to determine the truth of an event. In the case of noise, the analyzer waits to see if the threshold is reached, but will return to idle within 2 μs of detecting the noise. The circuit 64 includes plural parallel channels, in the preferred embodiment a channel for each half of an array 20. In the unlikely instance of two or more simultaneous (within 20 ns of each other) events incident upon the same half of a detector array, both events are discarded as they are difficult to isolate.

Figure 5:
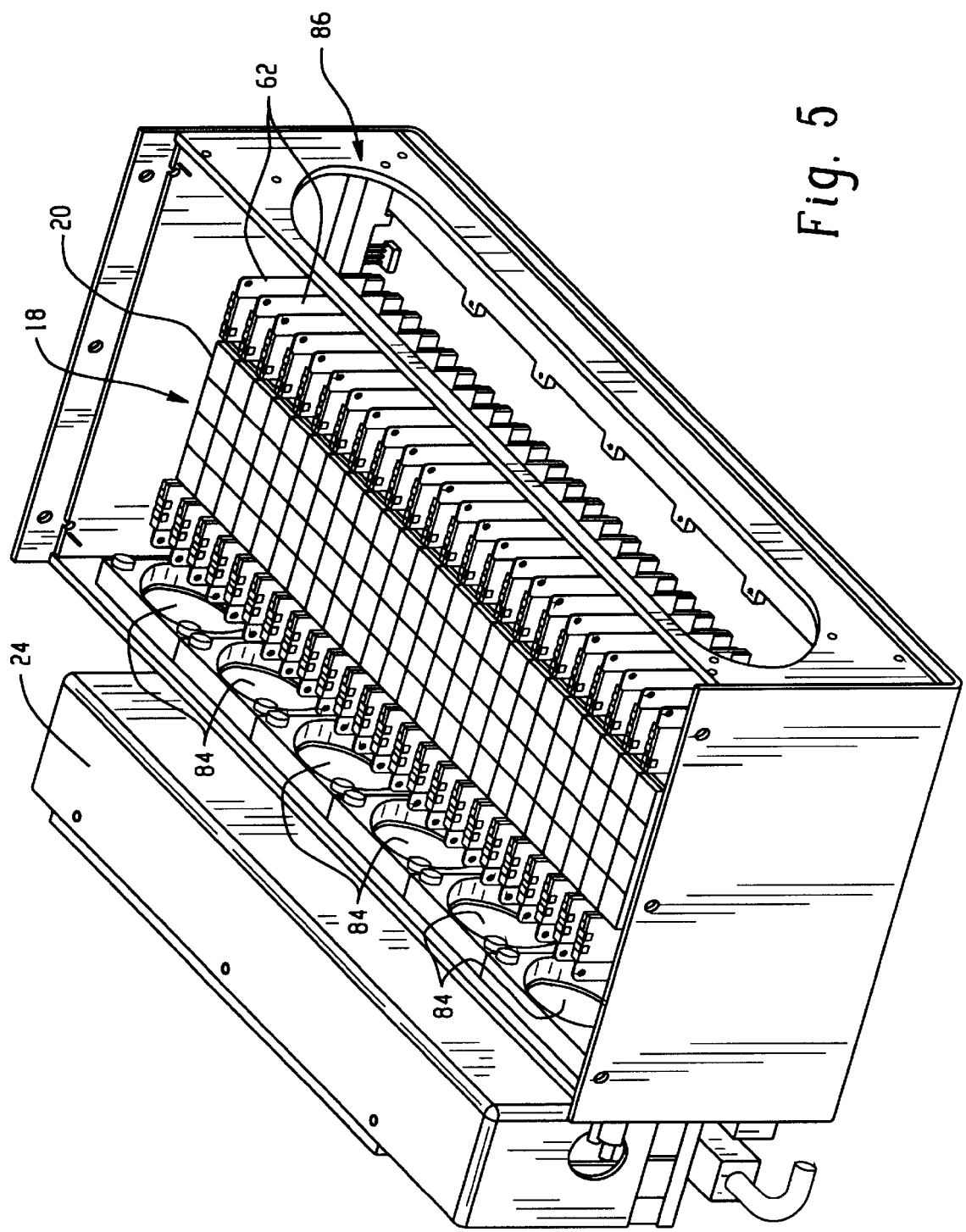

In the preferred embodiment, with reference to FIG. 5 a set of fans 84 draw outside air through the channels 80 across the circuit boards 62 cooling the components located thereon. More specifically, the fans are mounted in apertures in one side wall of a housing opposite an air inlet 86. When the top and bottom of the housing are closed, air flow is constrained to flow along the boards, over the components.

As shown in FIG. 3, the circuit boards 62 have vertical connector sockets 82. More specifically, each of the detector arrays 20 has two rows of pins extending from its lower side. Each back-to-back circuit board pair or two-sided circuit board 62 includes four sockets 82 mounted facing toward one of the edges. Placing sockets on opposite sides of the circuit board provides a stable mechanical mounting for each array as well as a reliable electrical interconnection.

In the preferred embodiment, with reference to FIG. 5 a set of fans 84 draw outside air through the channels 80 across the circuit boards 62 cooling the components located thereon. More specifically, the fans are mounted in apertures in one side wall of a housing 84 opposite an air inlet 86. When the top and bottom of the housing are closed, air flow is constrained to flow along the boards, over the components.

Optionally, a coolant or liquid cryogen, additional fans, or the like are incorporated in the housing to enhance cooling.

In an alternate embodiment, the radioactive source is mounted and fixed on the opposite side of the subject across from the detector array. In this manner, the γ-rays which originate outside the subject either from a point or line source of radioactive material or a low power x-ray tube pass through the subject.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method of nuclear imaging comprising:

injecting a subject with a radiopharmaceutical;

collimating radiation emitted by the radiopharmaceutical with parallel collimator vanes;

applying a voltage bias to a two dimensional array of CZT crystals;

converting the collimated radiation into electrical signals with the array of CZT detectors;

processing the signals from the array of CZT detectors with electrical components mounted to a parallel array of spaced circuit boards and concurrently generating heat with the electrical components;

disposing fans that move the air past the circuit boards adjacent a detector housing;

moving air between the circuit boards removing the heat;

rotating the collimator vanes, the detector array, and the circuit boards around the subject and an axis of rotation;

as the collimator vanes, the detector array and the circuit boards rotate around the axis of rotation, moving the collimator vanes, the detector array and the circuit boards about an axis with lateral rotational components of motion relative to the axis of rotation;

converting the processed signals into a human viewable image.

2. An apparatus for nuclear imaging comprising:

parallel collimator vanes for collimating radiation emitted by an injected radiopharmaceutical;

a biasing means for applying a voltage bias to a two dimensional array of CZT crystals;

the array of CZT detectors converting the collimated radiation into electrical signals;

electrical components mounted to a parallel array of spaced circuit boards for processing the signals from the array of CZT detectors and concurrently generating heat;

fans disposed adjacent a detector housing to move the air past and between the circuit boards removing the heat;

a means for rotating the collimator vanes, the CZT detector array, and the circuit boards around the subject and an axis of rotation;

a means for moving the collimator vanes, the detector array, and the circuit boards about an axis with lateral rotational components of motion relative to the axis of rotation, as the collimator vanes, the detector array and the circuit boards rotate around the axis of rotation;

a means for converting the processed signals into a human viewable image.

* * * * *